United States Patent
Jiang (10) Patent No.: US 8,449,192 B2
(45) Date of Patent: May 28, 2013

(54) SELF-LUBRICATING BEARING SYSTEM AND MOTOR COMPRISING THE SAME

(75) Inventor: Xinzheng Jiang, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/244,958

(22) Filed: Sep. 26, 2011

(65) Prior Publication Data

US 2012/0014630 A1 Jan. 19, 2012

Related U.S. Application Data

(63) Continuation of application No. PCT/CN2010/070297, filed on Jan. 21, 2010.

(30) Foreign Application Priority Data

Mar. 25, 2009 (CN) ...................... 2009 2 0053673 U (51) Int. Cl.
*F16C 33/10* (2006.01)
(52) U.S. Cl.
CPC .................................. *F16C 33/103* (2013.01)
USPC .......................................... 384/397; 384/322
(58) Field of Classification Search
USPC ................. 384/100, 114, 129, 160, 213, 214, 384/286–291, 293, 322, 372–394, 397–402, 384/410–414
See application file for complete search history.

(56) References Cited

U.S. PATENT DOCUMENTS

| | | | | | |
|---|---|---|---|---|---|
| 4,198,584 | A | * | 4/1980 | Otto | 310/90 |
| 4,350,912 | A | * | 9/1982 | Burton | 310/90 |
| 4,599,006 | A | * | 7/1986 | Abel | 384/136 |
| 4,634,298 | A | * | 1/1987 | Crawford | 384/209 |
| 5,677,584 | A | * | 10/1997 | Keck | 310/90 |
| 2007/0223847 | A1 | * | 9/2007 | Lim | 384/100 |

FOREIGN PATENT DOCUMENTS

CN 2589732 * 12/2003

OTHER PUBLICATIONS

Translation of Abstract for CN2589732 obtained on May 9, 2012.*

* cited by examiner

*Primary Examiner* — James Pilkington
(74) *Attorney, Agent, or Firm* — Matthias Scholl P.C.; Matthias Scholl (57) ABSTRACT

A self-lubricating bearing system, including a sliding bearing (1), an oil-storage groove (2), and lubricating oil (3). The oil-storage groove (2) is disposed in the sliding bearing (1). The lubricating oil (3) is disposed in the oil-storage groove (2). A housing (4) is fit on the sliding bearing (1). The housing (4) extends from front end surface of the sliding bearing (1). The top of the housing (4) bends inwards to form an oil-return barb (5). A retaining ring (9) is disposed on the front end surface of the sliding bearing (1). An oil-return hole (10) is formed between the retaining ring (9) and the sliding bearing (1). The oil-return hole (10) is connected to the oil-storage groove (2).

6 Claims, 7 Drawing Sheets

Prior Art

FIG. 1

Prior Art

FIG. 7

SELF-LUBRICATING BEARING SYSTEM AND MOTOR COMPRISING THE SAME

CROSS-REFERENCE TO RELATED APPLICATIONS

This application is a continuation of International Patent Application No. PCT/CN2010/070297 with an international filing date of Jan. 21, 2010, designating the United States, now pending, and further claims priority benefits to Chinese Patent Application No. 200920053673.8 filed on Mar. 25, 2009. The contents of all of the aforementioned applications, including any intervening amendments thereto, are incorporated herein by reference.

BACKGROUND OF THE INVENTION

1. Field of the Invention

The invention relates to a self-oiling sliding bearing system and a motor using the same.

2. Description of the Related Art

Figure 1:
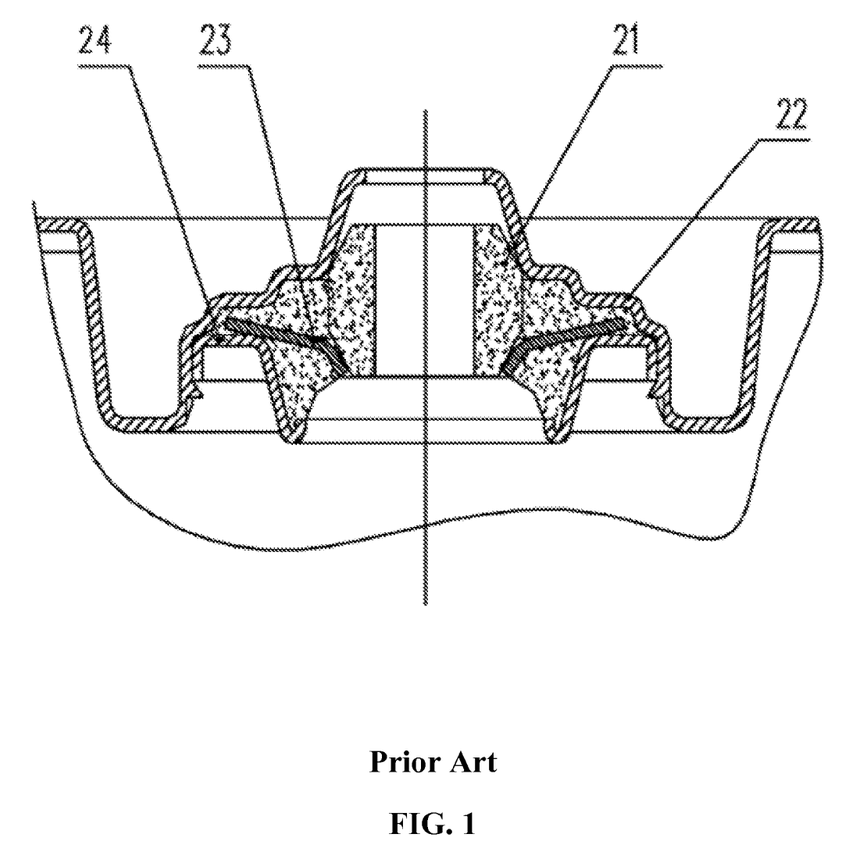
FIG. 1 is a schematic view of a sliding bearing in the prior art.

As shown in FIG. 1, a sliding bearing system in the prior art is illustrated. A sliding bearing 21 and an end cover 22 form an integrated transmission system via an elastic washer 23 and a pressing cap 24. The integrated sliding bearing system features complex structure, troublesome installation, high production cost, and difficult maintenance, is not a standard part or a general part, frictional heat thereof is high, and requirement for lubricating is comparatively high.

Figure 2:
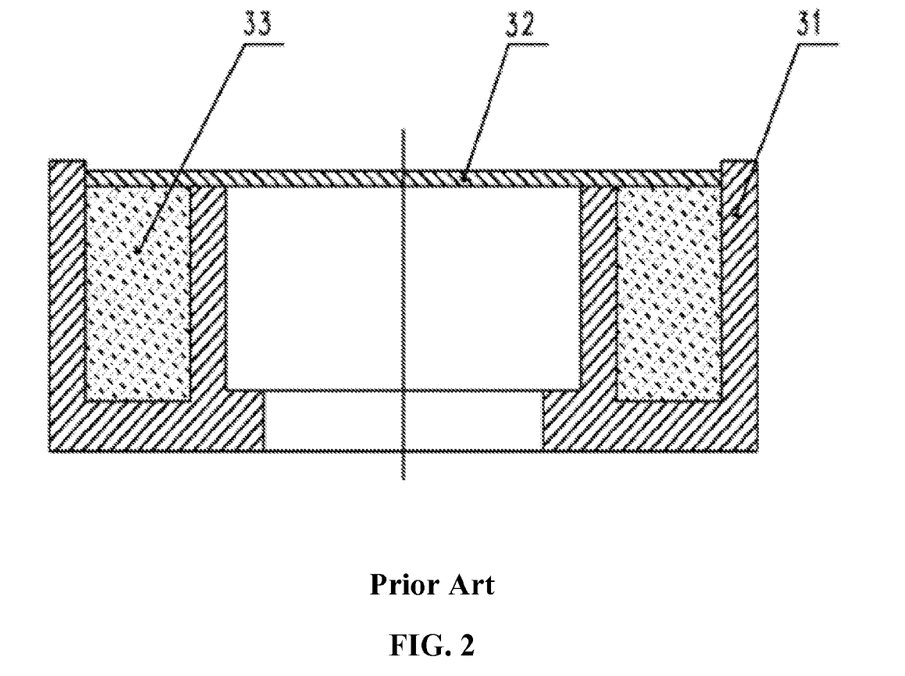
FIG. 2 is a schematic view of another sliding bearing in the prior art.

FIG. 2 illustrates another sliding bearing system, comprising a sliding bearing 31, a sealing ring 32, and lubricating oil 33, since the sliding bearing lacks necessary oil supply structure, and oil recovery structure, it is still in an exploration stage, and no promotion thereof is performed.

SUMMARY OF THE INVENTION

In view of the above-described problem, it is an objective of the invention to provide a self-oiling sliding bearing system that features simple structure, convenient installation, use and maintenance, low production cost, wider application range, and improved standardization and generalization.

To achieve the above objectives, in accordance with one embodiment of the invention, provided is a self-oiling sliding bearing system, comprising a sliding bearing, an oil-storage reservoir or groove, and lubricating oil, the oil-storage groove is disposed in the sliding bearing, the lubricating oil is disposed in the oil-storage groove, a housing is fit on the sliding bearing, the housing extends from front end surface of the sliding bearing, the top of the housing bends inwards to form an oil-return barb, a retaining ring is disposed on the front end surface of the sliding bearing, an oil-return hole is formed between the retaining ring and the sliding bearing, and the oil-return hole is connected to the oil-storage groove.

In a class of this embodiment, the sliding bearing comprises an outer ring, and an inner ring, the oil-storage groove is formed between the outer ring, and the inner ring, and the outer ring is connected to the inner ring via a rib.

In a class of this embodiment, a front bending part is formed at a contact between the housing and the front end surface of the sliding bearing, and a rear bending part is formed at a contact between the housing and rear end surface of the sliding bearing, whereby facilitating positioning of the sliding bearing.

In a class of this embodiment, the inner ring is disposed in the outer ring, axial dimension of the inner ring is comparatively small, and the inner ring is received in the outer ring whereby forming an oil supply gap.

In a class of this embodiment, multiple small oil leakage gaps are formed in the inner ring whereby forming oil supply channels.

In a class of this embodiment, the retaining ring is pressed by the front bending part.

Advantages of the self-oiling sliding bearing system comprise: 1) the housing is fit on the sliding bearing, the housing extends from front end surface of the sliding bearing, and the top thereof bends inwards to form the oil-return barb, and the oil-storage groove is disposed in the sliding bearing, whereby forming a compete oil recovery structure, which is capable of operating normally for a long time, and features simple and convenient maintenance; 2) structure of the invention is simple, production thereof is low, and standardization and generalization thereof are greatly improved, which make the invention suitable for mass production; 3) the sliding bearing system is independent from the end cover, and use and installation thereof are convenient; 4) in certain conditions, the invention can replace a rolling bearing, and solve problems with the rolling bearing that loading bearing capacity is small, and noise is large, and thus an application range thereof becomes wider; 5) the retaining ring is disposed on the front end surface of the sliding bearing, the oil-return hole is disposed between the retaining ring and the sliding bearing, the oil-return hole is connected to the oil-storage groove, lubricating oil recovered by the oil-return barb flows back to the oil-storage groove, and structure thereof is simple; 6) the oil supply gap is formed on the inner ring of the sliding bearing, and lubricating oil of the oil-storage groove is supplied via the oil supply gap.

It is another objective of the invention to provide a motor with the above-mentioned self-oiling sliding bearing system disposed thereon that features simple structure of an end cover, and the bearing system, convenient installation, use and maintenance, and low production cost.

In accordance with another embodiment of the invention, provided is a motor, comprising an end cover, a rotary shaft, and a self-oiling sliding bearing, comprising a sliding bearing, a bearing seat is disposed on the end cover, the self-oiling sliding bearing is received in the bearing seat, the lubricating oil is disposed in an oil-storage groove disposed in the sliding bearing, a housing is fit on the sliding bearing, the housing extends from front end surface of the sliding bearing, the top of the housing bends inwards to form an oil-return barb, a retaining ring is disposed on the front end surface of the sliding bearing, an oil-return hole is formed between the retaining ring and the sliding bearing, the oil-return hole is connected to the oil-storage groove, the sliding bearing comprises an outer ring, and an inner ring, the oil-storage groove is formed between the outer ring, and the inner ring, the outer ring is connected to the inner ring via a rib, and the rotary shaft is fit on the inner ring.

In a class of this embodiment, a shaft sleeve is fit on the rotary shaft, the shaft sleeve is disposed in the housing, and between the oil-return barb and the retaining ring, and a sealing ring is disposed between the sliding bearing, and the end cover.

In a class of this embodiment, the inner ring is disposed in the outer ring, axial dimension of the inner ring is comparatively small, and the inner ring is received in the outer ring whereby forming an oil supply gap.

Advantages of the motor comprise: 1) the self-oiling sliding bearing of the invention can simplifies design of the end cover, and reduce cost; 2) the self-oiling sliding bearing of the invention features long work life, no need for maintenance of the bearing system, and convenient use; 3) the self-oiling sliding bearing of the invention can be directly installed in the bearing seat as a standard part, and features convenient and simple installation, and improved production efficiency.

DETAILED DESCRIPTION OF THE EMBODIMENTS

Further description of the invention will be given below in conjunction with specific embodiments and accompanying drawings.

Figure 3:
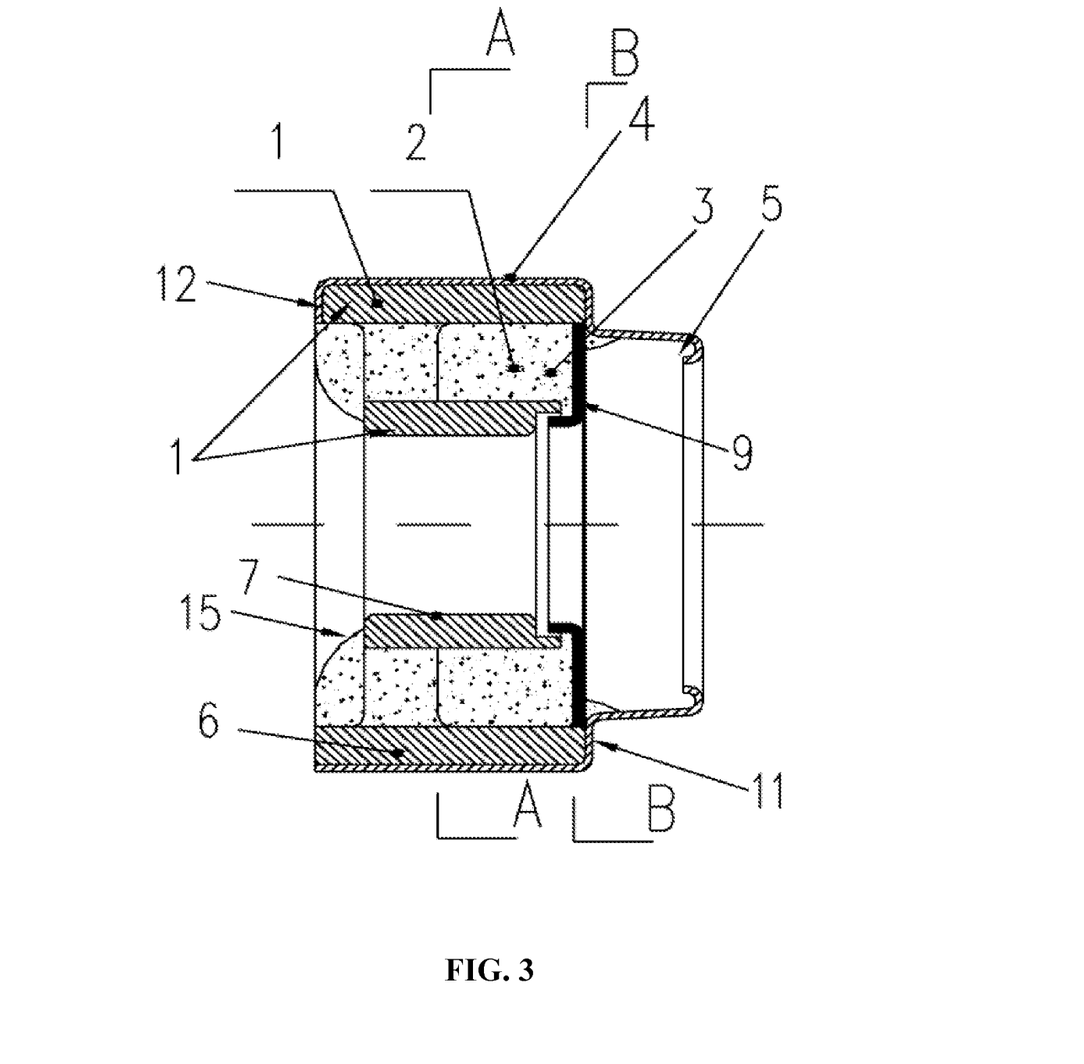
FIG. 3 is a cross-sectional view of a self-oiling sliding bearing system of an exemplary embodiment of the invention.
Figure 4:
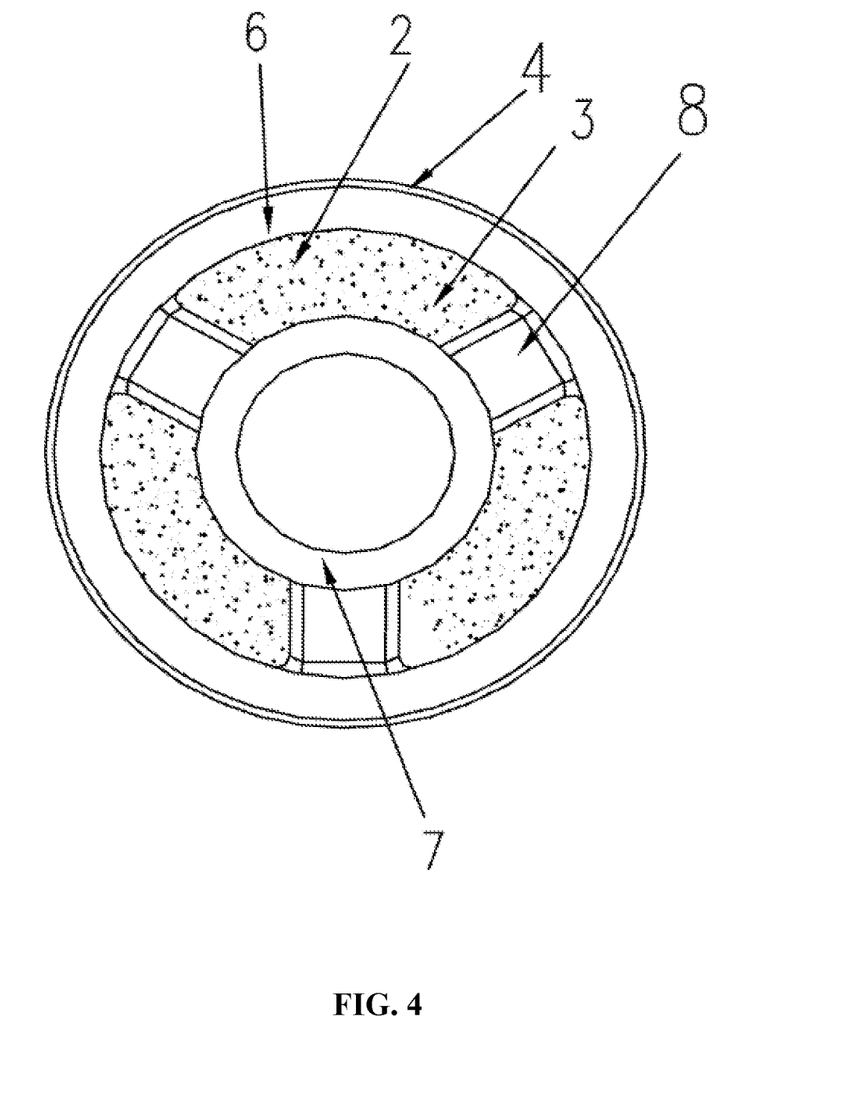
FIG. 4 is cross-sectional view of FIG. 3 along an A-A direction.
Figure 5:
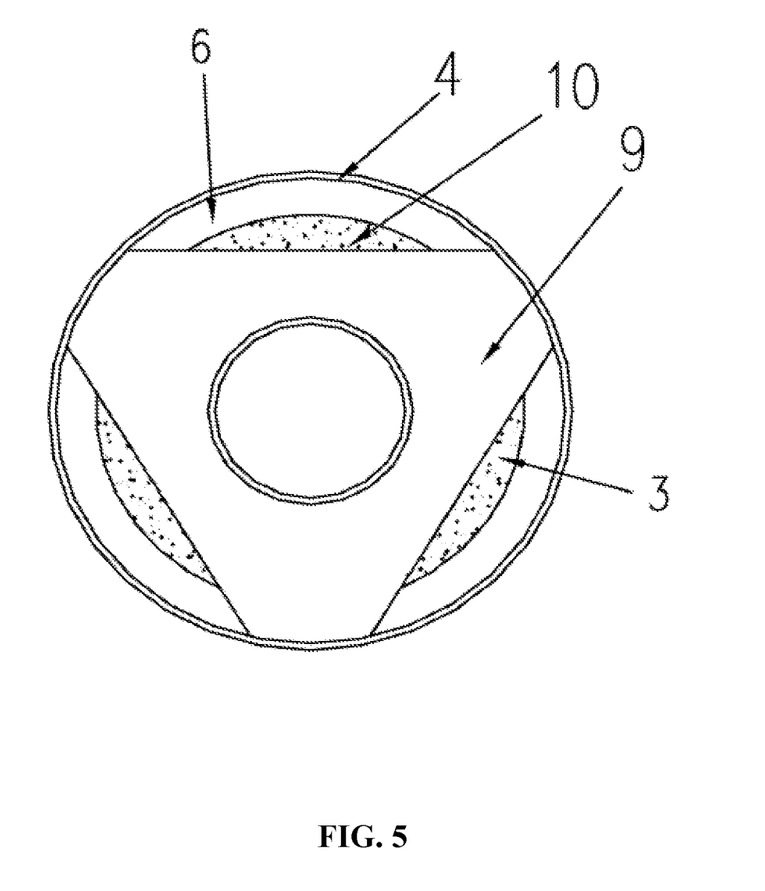
FIG. 5 is cross-sectional view of FIG. 3 along a B-B direction.

As shown in FIGS. 3, 4 and 5, a self-oiling sliding bearing system of the invention comprises a sliding bearing 1, an oil-storage groove 2, and lubricating oil 3.

The oil-storage groove 2 is disposed in the sliding bearing 1, the lubricating oil 3 is disposed in the oil-storage groove 2, a housing 4 is fit on the sliding bearing 1, the housing 4 extends from front end surface of the sliding bearing 1, the top of the housing 4 bends inwards to form an oil-return barb 5, a retaining ring 9 is disposed on the front end surface of the sliding bearing 1, an oil-return hole 10 is formed between the retaining ring 9 and the sliding bearing 1, and the oil-return hole 10 is connected to the oil-storage groove 2.

The sliding bearing 1 comprises an outer ring 6, and an inner ring 7, the oil-storage groove 2 is formed between the outer ring 6, and the inner ring 7, and the outer ring 6 is connected to the inner ring 7 via multiple ribs 8. In this embodiment, three or more ribs 8 are uniformly distributed in a circumferential direction.

A front bending part 11 is formed at a contact between the housing 4 and the front end surface of the sliding bearing 1, and a rear bending part 12 is formed at a contact between the housing 4 and rear end surface of the sliding bearing 1, whereby facilitating positioning of the sliding bearing 1.

The inner ring 7 is disposed in the outer ring 6, axial dimension of the inner ring 7 is comparatively small, and the inner ring 7 is received in the outer ring 6 whereby forming an oil supply gap 15.

Figure 7:
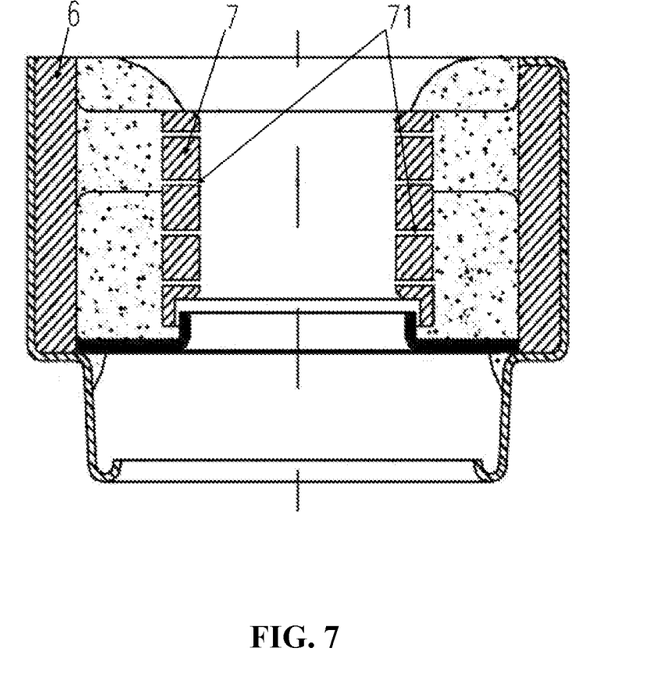
FIG. 7 is a cross-sectional view of a self-oiling sliding bearing system having oil leakage gaps in the inner ring in an exemplary embodiment of the invention.

Multiple small oil leakage gaps 71 are formed in the inner ring 7 whereby forming oil supply channels.

The retaining ring 9 is pressed by the front bending part 11.

Thus, a complete oil recovery structure is formed, which is capable of operating for long time, features simple and convenient maintenance, simple structure, low production cost, and greatly improved standardization and generalization, and is fit for mass production.

As shown in FIGS. 3, 4, 5 and 6, a motor of the invention comprises an end cover 16, a rotary shaft 17, and a self-oiling sliding bearing, comprising a sliding bearing 1, a bearing seat 14 is disposed on the end cover 16, the self-oiling sliding bearing is received in the bearing seat 14, the lubricating oil 3 is disposed in an oil-storage groove 2 disposed in the sliding bearing 1, a housing 4 is fit on the sliding bearing 1, the housing 4 extends from front end surface of the sliding bearing 1, the top of the housing 4 bends inwards to form an oil-return barb 5, a retaining ring 9 is disposed on the front end surface of the sliding bearing 1, an oil-return hole 10 is formed between the retaining ring 9 and the sliding bearing 1, the oil-return hole 10 is connected to the oil-storage groove 2, the sliding bearing 1 comprises an outer ring 6, and an inner ring 7, the oil-storage groove 2 is formed between the outer ring 6, and the inner ring 7, the outer ring 6 is connected to the inner ring 7 via a rib 8, and the rotary shaft 17 is fit on the inner ring 7.

Figure 6:
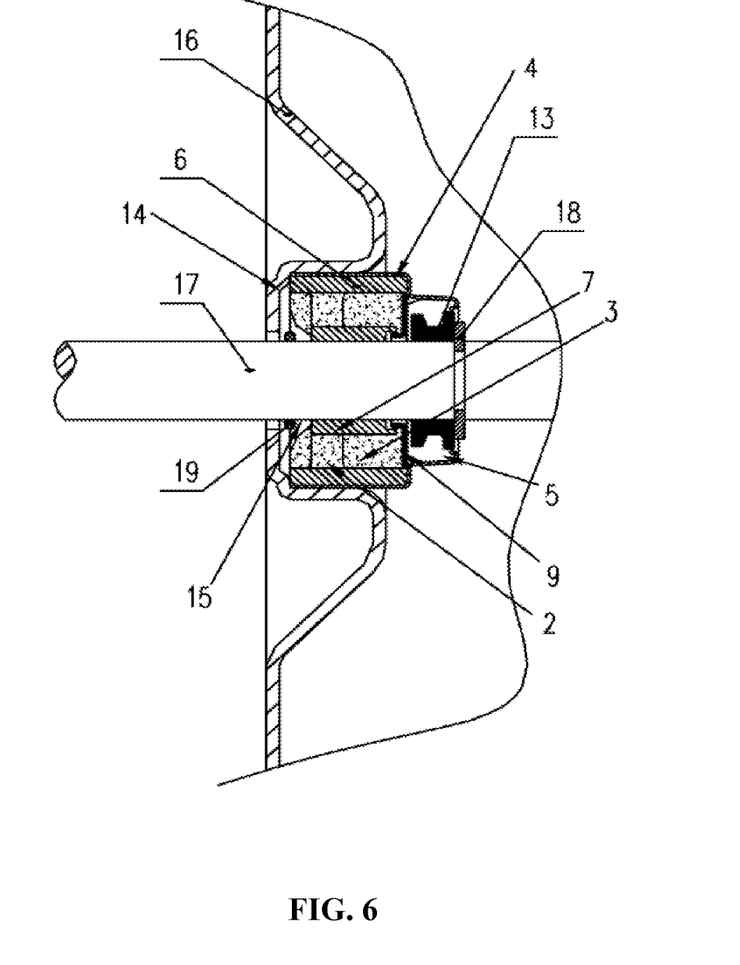
FIG. 6 is a schematic view of a motor comprising a self-oiling sliding bearing system of another exemplary embodiment of the invention.

A shaft sleeve 13 is fit on the rotary shaft 17, the shaft sleeve 13 is disposed in the housing 4, and between the oil-return barb 5 and the retaining ring 9, and a sealing ring 19 is disposed between the sliding bearing 1, and the end cover 16.

The inner ring 7 is disposed in the outer ring 6, axial dimension of the inner ring 7 is comparatively small, and the inner ring 7 is received in the outer ring 6 whereby forming an oil supply gap 15.

Operation principle of the invention is: during rotation of the motor, the rotary shaft rotates at high speed. Lubricating oil in the oil-storage groove 2 flows into inner wall of the inner ring 7, and part of the lubricating oil axially flows over from the front of the sliding bearing 1, is thrown to inner wall of the housing 4, and flows back to the oil-return barb 5 via the inner wall. The oil-return barb 5 transmits the overflow lubricating oil to the retaining ring 9. The oil-return hole 10 is formed between the retaining ring 9 and the sliding bearing 1. Since the oil-return hole 10 and the oil-return hole 10 are connected to the oil-storage groove 2, the overflow lubricating oil flows back to the oil-storage groove 2. On the other hand, the lubricating oil is supplied from the gap 15, or from small gaps 71 in the inner ring 7. Thus, a complete oil recovery structure is formed, which is capable of operating for long time, features simple and convenient maintenance, simple structure, low production cost, and greatly improved standardization and generalization, and is fit for mass production.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A bearing system, comprising:
   a sliding bearing (1);
   an oil-storage reservoir (2);
   lubricating oil (3); and
   a housing (4) comprising an oil-return barb (5), a front part (11), and a rear part (12);
   wherein:
   said oil-storage reservoir (2) is disposed in said sliding bearing (1);
   said lubricating oil (3) is disposed in said oil-storage reservoir (2);
   said housing (4) is disposed on said sliding bearing (1);
   said housing (4) extends from a front end surface of said sliding bearing a top of said housing (4) bends inwards to form said oil-return barb (5);
   a retaining ring (9) is disposed on said front end surface of said sliding bearing (1);

an oil-return hole (10) is formed between said retaining ring (9) and said sliding bearing (1);

said oil-return hole (10) is connected to said oil-storage reservoir (2);

said sliding bearing (1) comprises an outer ring (6) and an inner ring (7);

said oil-storage reservoir (2) is formed between said outer ring (6) and said inner ring (7);

said outer ring (6) is connected to said inner ring (7) via a rib (8); and said front part (11) is formed at a contact between said housing (4) and said front end surface of said sliding bearing (1), and said rear part (12) is formed at a contact between said housing (4) and rear end surface of said sliding bearing (1), whereby facilitating positioning of said sliding bearing (1).

2. The bearing system of claim 1, wherein:

said inner ring (7) is disposed in said outer ring (6);

an axial dimension of said inner ring (7) is smaller than an axial dimension of said outer ring (6); and said inner ring (7) is received in said outer ring (6) whereby forming an oil supply gap (15).

3. The bearing system of claim 2, wherein multiple oil leakage gaps are formed in said inner ring (7) whereby forming oil supply channels.

4. The bearing system of claim 1, wherein multiple oil leakage gaps are formed in said inner ring (7) whereby forming oil supply channels.

5. The bearing system of claim 1, wherein said retaining ring (9) is pressed by said front part (11).

6. A bearing system, comprising:

a sliding bearing (1);

an oil-storage reservoir (2);

lubricating oil (3); and a housing (4) comprising an oil-return barb (5) and a front part (11);

wherein:

said oil-storage reservoir (2) is disposed in said sliding bearing (1);

said lubricating oil (3) is disposed in said oil-storage reservoir (2);

said housing (4) is disposed on said sliding bearing (1);

said housing (4) extends from a front end surface of said sliding bearing (1);

a top of said housing (4) bends inwards to form said oil-return barb (5);

a retaining ring (9) is disposed on said front end surface of said sliding bearing (1);

an oil-return hole (10) is formed between said retaining ring (9) and said sliding bearing (1);

said oil-return hole (10) is connected to said oil-storage reservoir (2);

said retaining ring (9) is pressed by said front part (11);

said housing (4) further comprises a rear part (12); and said front part (11) is formed at a contact between said housing (4) and said front end surface of said sliding bearing (1), and said rear part (12) is formed at a contact between said housing (4) and rear end surface of said sliding bearing (1), whereby facilitating positioning of said sliding bearing (1).

\* \* \* \* \*